United States Patent [19]

Rea et al.

[11] Patent Number: 5,542,717
[45] Date of Patent: *Aug. 6, 1996

[54] QUICK CONNECT COUPLING

[75] Inventors: Perry J. Rea, Bloomfield Hills; Michael R. Miller, Rochester Hills; Dennis G. Kinder, Clarkston; Christopher J. Kargula, Sterling Heights; William E. Stevens, Ypsilanti, all of Mich.

[73] Assignee: Form Rite, Corporation, Auburn Hills, Mich.

[*] Notice: The term of this patent shall not extend beyond the expiration date of Pat. No. 5,462,313.

[21] Appl. No.: 471,906

[22] Filed: Jun. 7, 1995

Related U.S. Application Data

[63] Continuation-in-part of Ser. No. 176,243, Jan. 3, 1994, Pat. No. 5,462,313.

[51] Int. Cl.$^6$ .................................................. F16L 39/00
[52] U.S. Cl. ........................ 285/319; 285/351; 285/379; 285/910; 285/921
[58] Field of Search .................................. 285/319, 379, 285/910, 921, 351

[56] References Cited

U.S. PATENT DOCUMENTS

| | | |
|---|---|---|
| 1,029,715 | 6/1912 | Robinson . |
| 2,841,429 | 7/1950 | McCuistion ................ 285/910 X |
| 2,983,533 | 5/1961 | Tisch ........................... 285/910 X |
| 3,312,483 | 4/1967 | Leadbetter et al. ............... 285/340 |
| 3,413,021 | 11/1968 | Potts ................................. 285/319 |
| 3,450,424 | 6/1969 | Calisher .......................... 285/305 |
| 3,517,952 | 6/1970 | McCracken ................. 285/379 X |
| 3,569,903 | 3/1971 | Brishka ............................. 339/74 |
| 3,583,731 | 6/1971 | Jewell ................................ 285/85 |
| 3,584,902 | 6/1971 | Vyse ................................ 285/305 |
| 3,588,149 | 6/1971 | Demler, Sr. et al. ............. 285/110 |
| 3,601,361 | 8/1971 | Hundhausen et al. ........... 251/149.1 |
| 3,711,125 | 1/1973 | Dehar .............................. 285/111 |
| 3,826,523 | 7/1974 | Eschbaugh ........................ 285/39 |
| 3,838,093 | 10/1974 | Twogood et al. ............... 136/135 R |
| 3,885,523 | 6/1975 | Bartholomew ................... 285/382 |
| 3,997,195 | 12/1976 | Bartholomew ..................... 285/81 |
| 4,006,922 | 2/1977 | Bartholomew ..................... 285/39 |
| 4,173,362 | 11/1979 | Glover et al. .................... 285/110 |
| 4,310,185 | 1/1982 | Bartholomew ................... 285/369 |
| 4,423,892 | 1/1984 | Bartholomew ................... 285/319 |
| 4,524,995 | 6/1985 | Bartholomew ..................... 285/54 |
| 4,526,411 | 7/1985 | Bartholomew ................... 285/305 |
| 4,541,658 | 9/1985 | Bartholomew ................... 285/319 |

(List continued on next page.)

FOREIGN PATENT DOCUMENTS

| | | | |
|---|---|---|---|
| 1181269 | 2/1970 | United Kingdom ................ 285/379 |
| 1251795 | 10/1971 | United Kingdom ................ 285/379 |

Primary Examiner—Dave W. Arola
Attorney, Agent, or Firm—Howard & Howard

[57] ABSTRACT

A quick connect coupling including a tubular male connector member and a female connector assembly. The male connector member is tubular and defines a front pilot portion and an external bead positioned rearwardly of the pilot portion. The female assembly comprises a tubular housing, a cap which is snap fit over the front end of the housing, a seal which seats in a seal bore defined by the housing, and a seal retainer which is positioned against the front end of the housing and acts to maintain the seal in position within the seal bore. The cap is fit into position on the front end of the housing by the snapping coaction of a plurality of circumferentially spaced cap fingers with an external flange on the front end of the housing and the cap further defines a plurality of latching fingers which extend rearwardly and radially inwardly from the front end of the cap for latching coaction with the rear annular face of the bead as the front annular face of the bead seats against the front annular face of the seal retainer. The seal comprises a single piece member including a tubular main body portion, a series of internal annular axially spaced rib portions on the interior of the main body portion for sealing coaction with the pilot portion, and a series of external annular axially spaced rib portions defined on the exterior of the main body portion for coaction with the seal bore.

20 Claims, 4 Drawing Sheets

U.S. PATENT DOCUMENTS

| | | | |
|---|---|---|---|
| 4,601,497 | 7/1986 | Bartholomew | 285/319 |
| 4,669,757 | 6/1987 | Bartholomew | 285/55 |
| 4,681,351 | 7/1987 | Bartholomew | 285/319 |
| 4,743,051 | 5/1988 | Proni | 285/319 |
| 4,749,214 | 6/1988 | Hoskins et al. | 285/4 |
| 4,778,203 | 10/1988 | Bartholomew | 285/111 |
| 4,790,569 | 12/1988 | Chaffee | 285/40 |
| 4,869,534 | 9/1989 | Ketcham et al. | 285/24 |
| 4,915,136 | 4/1990 | Bartholomew | 138/89 |
| 4,925,217 | 5/1990 | Ketcham | 285/93 |
| 4,927,185 | 5/1990 | McNaughton | 285/39 |
| 4,936,544 | 6/1990 | Bartholomew | 251/149.6 |
| 4,943,091 | 7/1990 | Bartholomew | 285/12 |
| 4,944,536 | 7/1990 | Bartholomew | 285/319 |
| 4,948,175 | 8/1990 | Bartholomew | 285/39 |
| 4,948,176 | 8/1990 | Bartholomew | 285/93 |
| 4,979,765 | 12/1990 | Bartholomew | 285/93 |
| 4,981,586 | 1/1991 | Bartholomew | 210/435 |
| 4,984,831 | 1/1991 | Bengtsson | 285/379 |
| 5,000,614 | 3/1991 | Walker et al. | 403/326 |
| 5,002,315 | 3/1991 | Bartholomew | 285/93 |
| 5,009,454 | 4/1991 | Bartholomew | 285/24 |
| 5,031,941 | 7/1991 | Bartholomew | 285/91 |
| 5,033,513 | 7/1991 | Bartholomew | 138/109 |
| 5,052,723 | 10/1991 | Bartholomew | 285/108 |
| 5,063,968 | 11/1991 | Bartholomew | 138/109 |
| 5,067,754 | 11/1991 | Bartholomew | 285/319 |
| 5,069,489 | 12/1991 | Bartholomew | 285/319 |
| 5,125,431 | 6/1992 | Vogel et al. | 137/561 A |
| 5,239,944 | 8/1993 | Hostetler | 285/379 X |
| 5,285,776 | 2/1994 | Bertram | 128/207.14 |
| 5,462,313 | 10/1995 | Rea et al. | 285/379 X |
| 5,466,017 | 11/1995 | Szabo et al. | 285/319 |

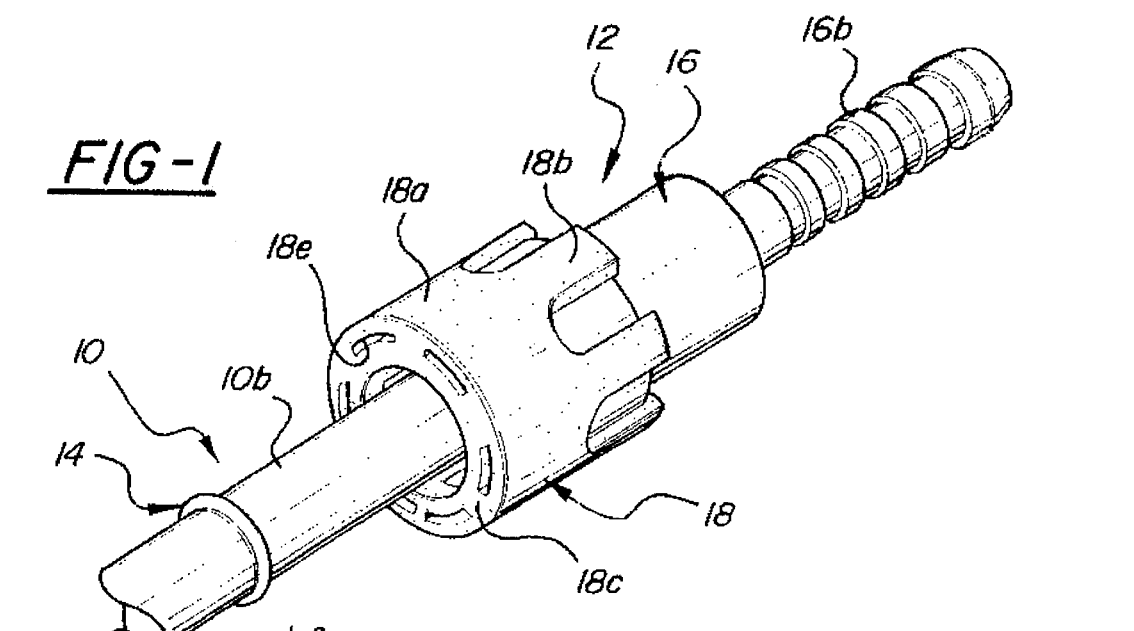
FIG-1
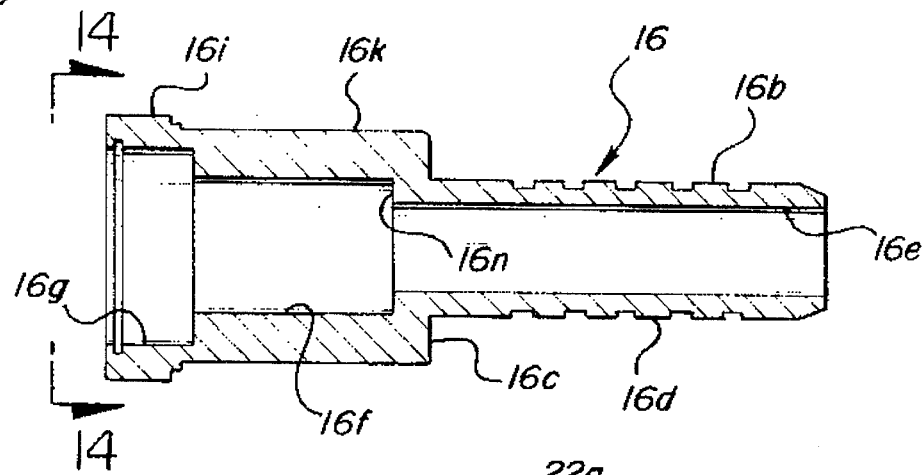
FIG-6
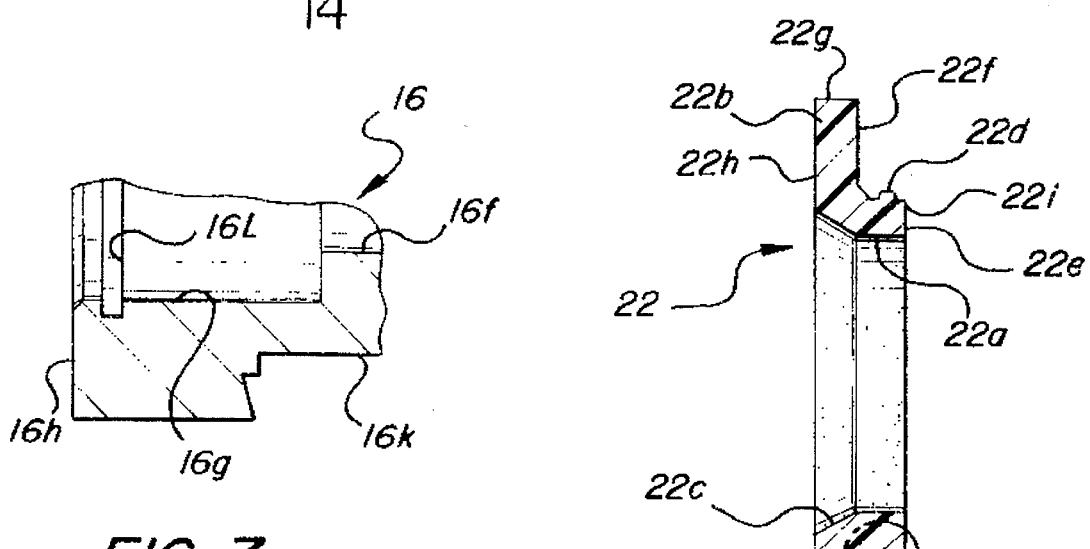
FIG-7
FIG-8

QUICK CONNECT COUPLING

REFERENCE TO RELATED APPLICATIONS

This application is a continuation-in-part of U.S. patent application Ser. No. 08/176,243 filed on Jan. 3, 1994 now U.S. Pat. No. 5,462,313.

FIELD OF THE INVENTION

This invention relates to a quick connect coupling for readily releasably connecting tubing elements.

BACKGROUND OF THE INVENTION

In systems utilizing conduits for transporting fluids, it is both necessary and desirable to provide for the rapid connection and disconnection of sections of such conduits. A good example is the hydraulic system of a motor vehicle which incorporates a large number of both rigid and flexible tubing elements which must reliably convey hydraulic fluid under pressure to ensure effective cooling of transmission and engine components.

Quick connectors for this type of tubing are well known. U.S. Pat. No. 3,584,902 issued to Vysa teaches the interconnection of tubing elements utilizing a removable spring clip assembly. Traditionally quick connect assemblies have utilized an internal locking element which engages both a male member and female member, as is shown by U.S. Pat. No. 3,569,903 issued to Brishka. These quick connect devices typically incorporate one or more O-ring seals such as those found in U.S. Pat. Nos. 4,601,497 and 4,915,136 issued to Bartholomew.

All the foregoing devices have inherent limitations both in the security of their engagement systems, the complexity of their construction, and the reliability of their seals.

SUMMARY OF THE INVENTION

This invention is directed to the provision of an improved quick connect coupling.

More specifically, this invention is directed to the provision of a quick connect coupling having an improved sealing arrangement, having an improved locking arrangement, and embodying a simple and improved methodology for constructing the coupling.

The invention coupling is of the type comprising a tubular male connector member including a front end pilot portion and an external annular bead defined at the rear end of the pilot portion; a first female connector member defining a capture bore sized to receive the pilot portion, a seal counterbore positioned forwardly of the capture bore, and a forward annular edge proximate the forward boundary of the seal bore; a second female connector member secured to the first female connector member and including an annular main body portion extending forwardly from the forward annular edge of the first female connector member and a plurality of circumferentially spaced resilient finger portions extending rearwardly and radially inwardly from the front end of the main body portion for latching coaction with the male connector member bead; and an annular elastomeric seal positioned in the seal counterbore.

According to the invention, the coupling further includes an annular seal retainer positioned within the second female connector member and against the forward annular edge of the first female connector member and the annular seal retainer includes a portion positioned proximate the seal to retain the seal in the seal counterbore and defines a forward annular face for seating coaction with the forward annular face of the male connector member bead with the members in coupled relation. This arrangement provides a ready and efficient means of maintaining the seal in the sealed counterbore and positively positioning the male connector member bead.

According to a further feature of the invention, the seal defines a forward annular face positioned rearwardly of the forward annular edge of the first female connector member and the retainer portion of the seal retainer extends rearwardly into the seal bore to a position proximate the forward annular face of the seal. This specific arrangement further facilitates the positioning of the seal in the seal counterbore.

According to a further feature of the invention, the seal retainer is arranged to snap in place on the forward annular edge of the first female connector member. This specific arrangement facilitates the assembly of the parts of the coupling and ensures that the seal retainer will remain in place.

According to a further feature of the invention, the second female connector member snaps in place over the first female connector member proximate the forward annular edge of the first female connector member. This arrangement further facilitates the ready assembly of the parts of the coupling.

According to a further feature of the invention, the second female connector member includes retainer means operative with the members in coupled relation to engage the front annular face of the seal retainer and maintain the seal retainer against the front annular edge of the first female connector member. In the disclosed embodiment of the invention, the retainer means includes a plurality of circumferentially spaced ribs on the inner surface of the main body portion of the second female connector member abuttingly engaging the front annular face of the seal retainer with the female members in coupled relation.

According to a further feature of the invention, the inner diameter of the seal retainer approximates the diameter of the pilot portion of the male member and defines a sliding fit with the pilot portion. This relationship minimizes cocking of the male member relative to the female members and thereby augments the seal between the members.

According to a further feature of the invention, the seal comprises a single piece annular elastomeric member including a tubular main body portion, a series of internal annular axially spaced rib portions defined on the interior of the main body portion for successive sealing coaction with the pilot portion as the pilot portion is inserted into the front end of the female member structure and into the capture bore, and a series of external annular axially spaced rib portions defined on the exterior of the main body portion and providing an interference fit with the seal counterbore. This specific seal construction, as compared to the prior art multiple O-ring seals, is extremely resistant to twisting displacement or cutting of the seal in response to insertion of the male member into the female member.

BRIEF DESCRIPTION OF THE DRAWINGS

FIG. 1 is a perspective view of a quick connect coupling according to the invention;

FIG. 2 is an exploded view of the invention quick connect coupling;

FIG. 3 is an exploded, cross-sectional view of the invention quick connect coupling;

FIG. 4 is a detail view taken within the circle 4 of FIG. 3;

FIG. 5 is a cross-sectional view of a female connector member utilized in the quick connect coupling;

FIG. 6 is a detail view of a second female connector member utilized in the quick connect coupling;

FIG. 7 is a detail view taken within the circle 7 of FIG. 6;

FIG. 8 is a cross-sectional view of a seal retainer utilized in the quick connect coupling;

DETAILED DESCRIPTION OF THE PREFERRED EMBODIMENT

Figure 9:
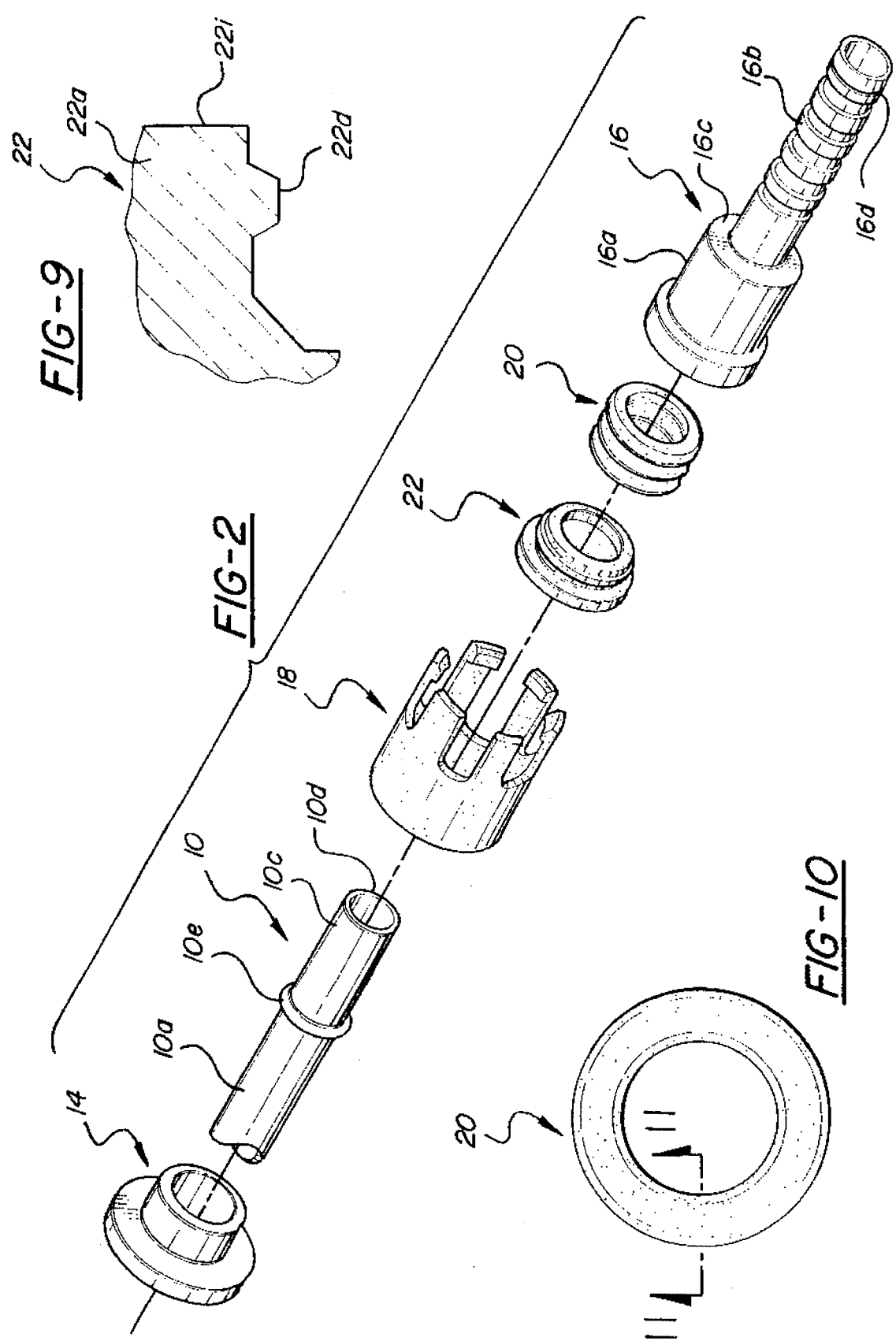
FIG. 9 is a detail view taken within the circle 9 of FIG. 8.
Figure 10:
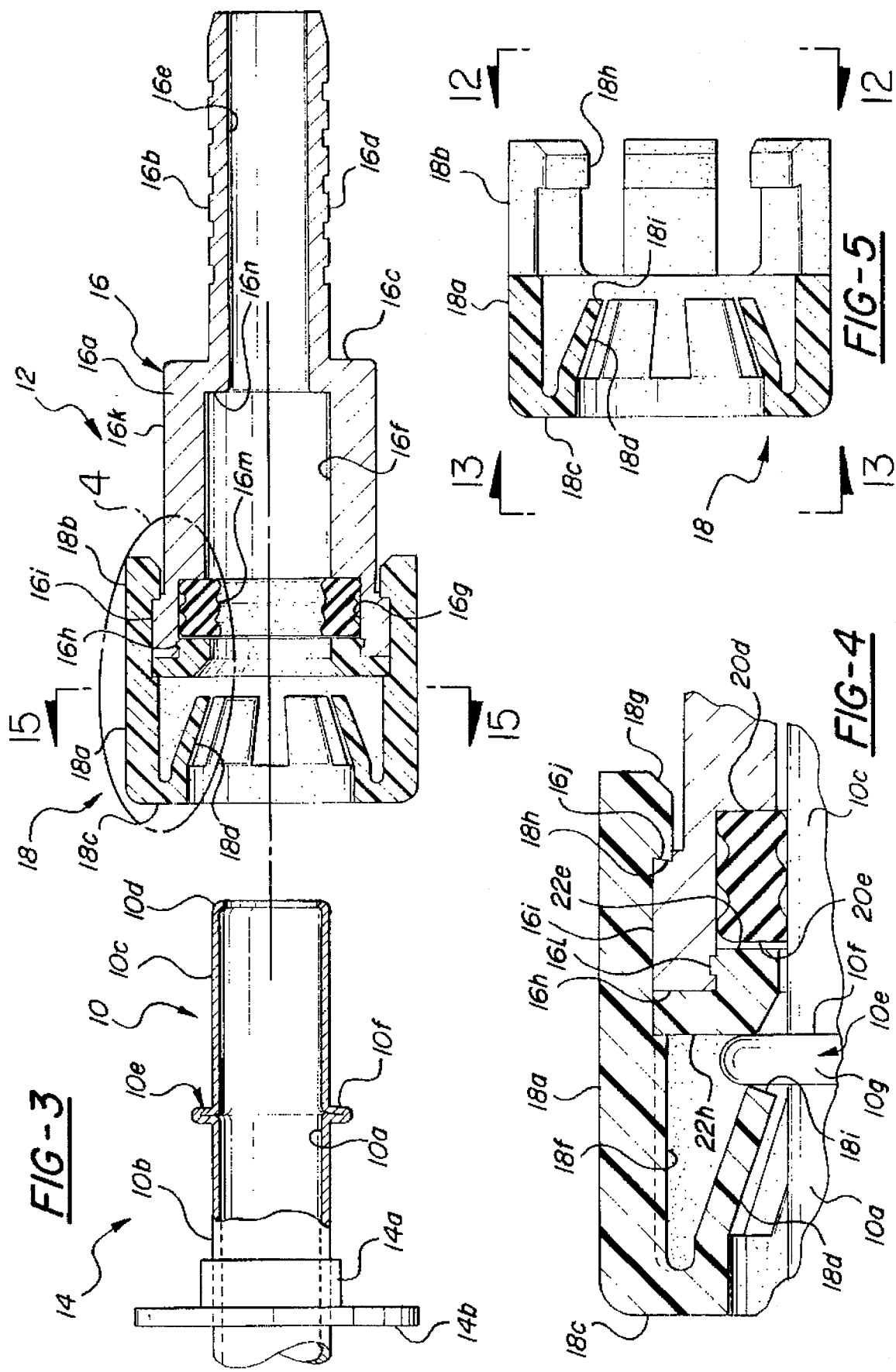
FIG. 10 is an end view of a seal utilized in the quick connect coupling.
Figure 11:
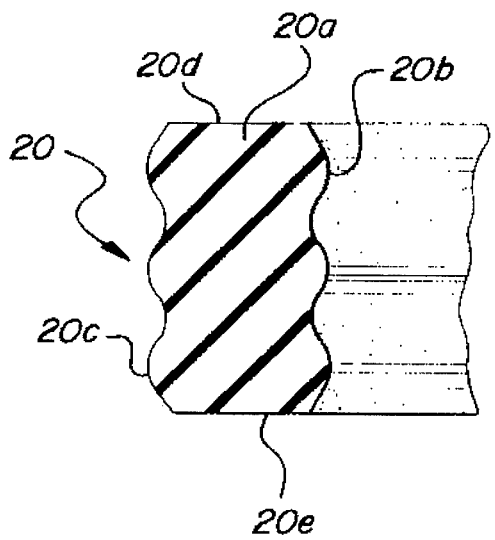
FIG. 11 is a cross-sectional view taken on line 11—11 of FIG. 10.
Figure 12:
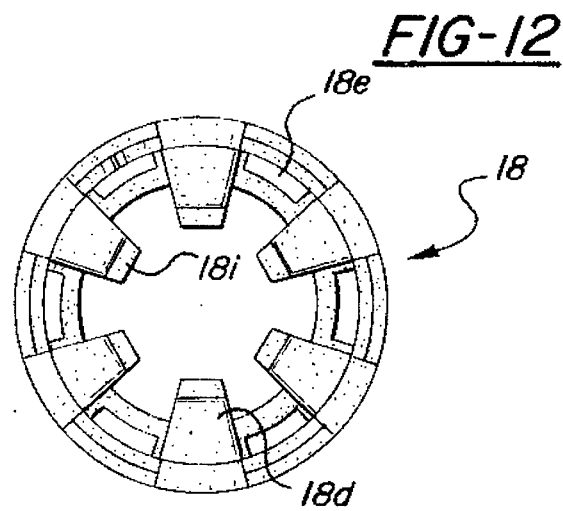
FIGS. 12 and 13 are views looking in the direction of the arrows 12 and 13, respectively, in FIG. 5.
Figure 13:
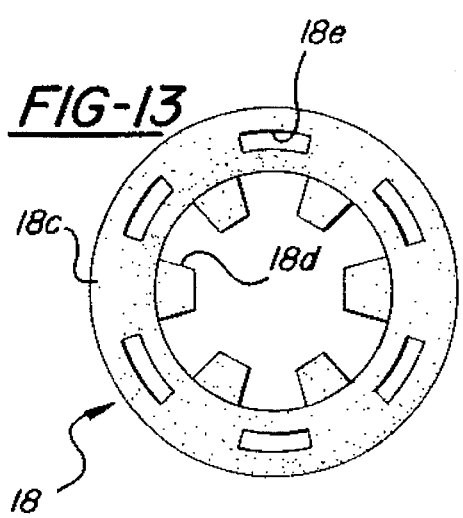
Figure 14:
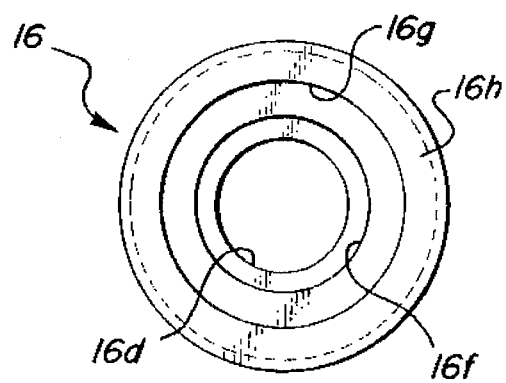
FIG. 14 is an end view looking in the direction of the arrow 14 in FIG. 6.
Figure 15:
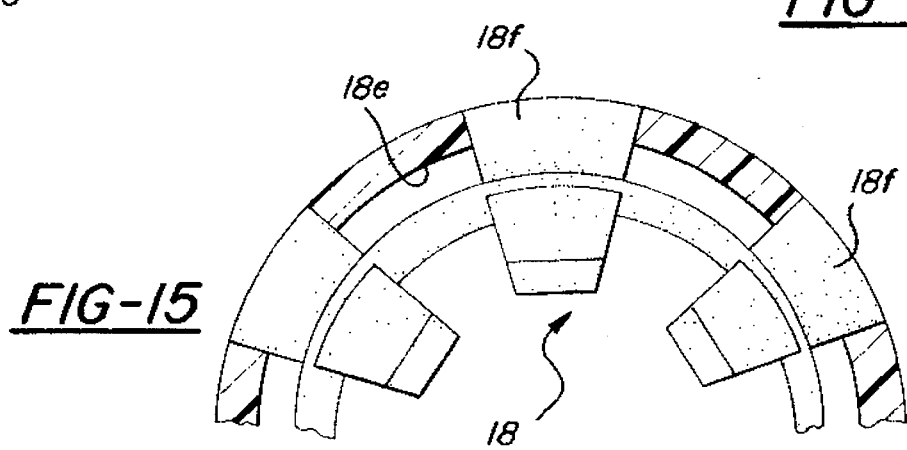
FIG. 15 is a fragmentary cross-sectional view taken on line 15—15 of FIG. 3.

The invention quick connect coupling, broadly considered, includes a male connector member 10, a female connector assembly 12, and a release member 14. It will be understood that the female connector assembly 12 and the male connector member 10 are adapted to be suitably secured to tubing elements and that the male and female connector members are operative in response to insertion of the male member into the female assembly to releasably connect the male member to the female member assembly and form a continuous fluid passage through the coupling to establish fluid communication between the tubing elements associated with the connector members.

Male connector member 10 may be formed, for example, of a suitable ferrous tubular material and defines a central through passage 10a. Male member 10 includes a main body tubular portion 10b including a front end pilot portion 10c terminating in a tapered front edge 10d, and an annular external bead 10e positioned at the rear end of the pilot portion 10c and constituting a latching or retainer means for the quick connect coupling.

Female connector assembly 12 comprises a four-part assembly including a tubular housing 16, a tubular cap 18, a seal 20, and a seal retainer 22.

Housing 16 may be formed, for example, of a suitable ferrous material and includes a main body portion 16a and a reduced diameter connector portion 16b forming an annular shoulder 16c with main body portion 16a and including a plurality of axially spaced grooves 16d. Connector portion 16b defines a tubular passage 16e and main body portion 16a defines a capture bore 16f sized to slidably receive pilot portion 10c of the male member and a seal counterbore 16g opening in the front face of the housing. Main body portion 16a defines an annular front edge 16h at the front face of the housing and an external latching flange 16i at the front end of the housing forming an annular undercut latching shoulder 16j with the primary cylindrical surface 16k of the main body portion. An internal annular groove 16l of rectangular cross section is defined proximate the forward end of seal counterbore 16g.

Tubular cap 18 is preferably formed of a suitable high temperature plastic in an injection molding operation. Cap 18 includes a cylindrical main body portion 18a, a plurality of circumferentially spaced latching finger portions 18b extending rearwardly from main body portion 18a, an annular internal flange 18c at the front edge of the cap, and a plurality of circumferentially spaced resilient latching finger portions 18d extending in cantilever fashion rearwardly and radially inwardly from flange 18c. Latching finger portions 18d are staggered circumferentially with respect to latching finger portions 18b so that a latching finger portion 18d is positioned circumferentially between each pair of latching finger portions 18b. A plurality of circumferentially spaced openings 18e are provided in flange 18c with each opening in circumferential alignment with a latching finger 18b. The internal periphery of body portion 18a is also configured to define a plurality of circumferentially spaced internal ribs 18f with each rib in circumferential alignment with a respective latching finger 18d. The rear edge of each latching finger 18b includes a leading or pilot surface 18g and a latching lip or ledge 18h is defined forwardly of pilot surface 18g.

Seal 20 is formed of a suitable elastomeric material and has a generally annular configuration. Seal 20 includes a tubular main body portion 20a, a series of internal annular axially spaced rib portions 20b defined on the interior of the main body portion, and a series of external annular axially spaced rib portions 20c defined on the exterior portion of the main body portion. There may be, as shown, three internal ribs and three external ribs with each internal rib being respectively radially aligned with an external rib. The maximum external diameter of external ribs 20c is slightly greater than the diameter of seal bore 16g and the minimum internal diameter of internal ribs 20b is slightly less than the diameter of the pilot portion 10c of the male connector member. The axial length of the seal is less than the axial length of the seal counterbore.

Seal retainer 22 is formed of a suitable high temperature plastic material and may, for example, be formed of the same plastic material as the material used to form cap 18. Seal retainer 22 includes a hub portion 22a sized to fit slidably on the pilot portion 10c of the male connector member and an externally extending flange portion 22b. Seal retainer 22 defines an angled annular pilot surface 22c at the internal juncture of the flange portion and the hub portion, and further defines an external annular snap rib or ring 22d on the exterior periphery of the hub portion. Hub portion 22a has an exterior diameter corresponding to the diameter of seal counterbore 16g and flange portion 22b has an exterior diameter corresponding to the interior diameter of cap 18.

Release member 14 includes a hub portion 14a sized to be slidably mounted on male member main body portion 10a and an externally extending flange portion 14b.

In the assembled relation of the female connector assembly, seal 20 is positioned in seal counterbore 16g with a frictional interference fit and with the rear annular edge 20d of the seal stopping just short of engagement with the annular shoulder 16m defined between bore 16f and counterbore 16g; seal retainer 22 is snap fit into the forward end of the seal counterbore with rib 22d snappingly received in groove 16l, the rear annular edge 22e of the hub portion positioned proximate but stopping just short of engagement with the front annular edge 20e of the seal, and the rear annular face 22f of the flange portion 22b abutting against the front annular edge 16h of the housing; cap 18 is snap fit over the front end of housing 16 by pressing the cap rearwardly relative to the front end of the housing to initially bias the finger portions 18b radially outwardly by virtue of pilot surface 18g whereby the finger portions may pass rearwardly over housing external flange 16i to snap into position over the flange with the lips 18h snapping into the undercut annular latching shoulder 16j at the rear edge of the flange, the interior surfaces of the latching fingers positioned snugly around the external annular edge 22g of the seal retainer flange portion 22b, and the rear end face of the cap ribs 18f abutting against the rear face 22h of the seal retainer flange portion to maintain the rear annular edge 22f of the flange portion against the front annular edge 16h of the housing and assist the snap ring 22d in maintaining the rear annular edge 22e of the seal retainer hub portion against the forward annular edge 20e of the seal and thereby preclude forward movement of the seal out of the seal counterbore. The female connector assembly is now ready for use in association with the male connector member 10.

Specifically, with hoses or tubes (not shown) suitably crimped to the connector portions 10b and 16b, pilot portion 10c is inserted into the front end of the female connector assembly to pass the pilot portion through seal 20 and position the pilot portion slidably in capture bore 16f with the front annular edge 10d of the pilot portion positioned proximate but spaced from the annular shoulder 16n defined at the juncture of capture bore 16f and central passage 16e. As the pilot portion moves into the female connector assembly, the internal ribs 20b of the seal are resiliently deformed and flattened so as to form a plurality of axially spaced relatively large area annular seals around the pilot portion and the bead 10e resiliently engages latching fingers 18d to move the fingers 18d radially outwardly to allow the passage of the bead whereafter, as the forward annular face 10f of external bead 10e seats against the forward annular face 22h of the flange portion of the seal retainer, the latching fingers 18d snap into position behind the bead and into engagement with the rear annular face 10g of the bead so that the bead is trapped between the rear annular end edges 18i of the latching fingers 18d and the forward annular face 22h of the seal retainer.

In the coupled relation of the male member and the female assembly, pilot portion 10c is received snugly within capture bore 16f, the seal firmly and resiliently engages the exterior periphery of the pilot portion at a plurality of axially spaced annular locations, the pilot portion fits snugly within internal diameter 22a of the hub portion of the seal retainer, and the bead 10e is held firmly between the free ends 18i of the finger portions 18d and the front annular face 22h of the flange portion of the seal retainer. Male member 10 is thereby held in a secure sealed disposition with respect to the female assembly.

Specifically, a plurality of axially spaced annular seals defined by the seal 20 provide superior sealing characteristics as between the members, and the capture bore 16f, seal 20, seal retainer 22, bead 10e and fingers 18d coact to firmly grasp the pilot portion of the male member relative to the female assembly and thereby effectively resist cocking of the pilot portion relative to the female assembly with subsequent derogation of the seal. The coupling is readily disconnected in the usual manner using the hub portion 14a of the disconnect member 14 to flex the fingers 18d radially outwardly to allow withdrawal of the male member from the female assembly.

The invention quick connect coupling will be seen to provide many important advantages. Specifically, the coupling is comprised of relatively few parts which may be formed of readily available and inexpensive materials utilizing readily available manufacturing techniques, thereby minimizing the costs of the parts of the coupling. Further, the parts of the coupling are assembled together utilizing simple push-in and snap-in maneuvers requiring relatively little skill and thereby further minimizing the cost of the coupling. Further, the single piece seal, by providing a plurality of axially spaced annular sealing surfaces, provides an extremely effective seal and eliminates the problems with prior art multiple individual seal arrangements which are subject to twisting displacement and cutting. Further, the manner in which the pilot portion of the male member is firmly captured by the female assembly minimizes cocking as between the male and female members and thereby further ensures that an effective seal will be maintained between the members.

Whereas a preferred embodiment of the invention has been illustrated and described in detail, it will be apparent that various changes may be made in the disclosed embodiment without departing from the scope or spirit of the invention.

We claim:

1. A quick connect coupling comprising:

a tubular male connector member including a front end pilot portion and an external annular bead defined at the rear end of the pilot portion;

a first female connector member defining a capture bore sized to receive the pilot portion, a seal counterbore positioned forwardly of the capture bore, and a forward annular edge proximate the forward boundary of the seal bore;

a second female connector member secured to the first female connector member and including an annular main body portion extending forwardly from the forward annular edge of the first female connector member and a plurality of circumferentially spaced resilient finger portions extending rearwardly and radially inwardly from the front end of the main body portion and latchingly coacting at their free rearward ends with the rear annular face of the bead in response to insertion of the pilot portion into the front end of the first female member and into the capture bore;

an annular elastomeric seal positioned in the seal counterbore; and an annular seal retainer positioned within the second female connector member and against the forward annular edge of the first female connector member, including a portion positioned proximate the seal to retain the seal in the seal counterbore, and defining a forward annular face for seating coaction with the forward annular face of the bead with the members in coupled relation.

2. A coupling according to claim 1 wherein the seal defines a forward annular face positioned rearwardly of the forward annular edge of the first female connector member and the retainer portion extends rearwardly into the seal bore to a position proximate the forward annular face of the seal.

3. A coupling according to claim 1 wherein the seal retainer is arranged to snap in place on the forward annular edge of the first female connector member.

4. A coupling according to claim 1 wherein the second female connector member snaps in place over the first female connector member proximate the forward annular edge of the first female connector member.

5. A coupling according to claim 1 wherein the seal comprises a single piece annular elastomeric member defining a series of axially spaced radially inwardly extending annular seal ribs sealingly and slidably engaging the pilot portion of the male connector member in response to insertion of the pilot portion into the front end of the first female connector member.

6. A coupling according to claim 1 wherein:

the second female connector member includes retainer means operative with the members in coupled relation to engage the front annular face of the seal retainer and maintain the seal retainer against the front annular edge of the first female connector member.

7. A coupling according to claim 6 wherein:

the retainer means includes a plurality of circumferentially spaced ribs on the inner surface of the main body portion of the second female connector member abuttingly engaging the front annular face of the seal retainer with the female members in coupled relation.

8. A coupling according to claim 1 wherein the inner diameter of the seal retainer approximates the diameter of the pilot portion and defines a sliding fit with the pilot portion.

9. A quick connect coupling comprising:

a tubular male connector member including a front end pilot portion and an external annular bead defined at the rear end of the pilot portion;

a first female connector member defining a capture bore sized to receive the pilot portion, a seal counterbore positioned forwardly of the capture bore, a forward annular edge proximate the forward boundary of the seal counterbore, and latch means on the exterior of the first female connector member proximate the forward annular edge;

an annular elastomeric seal positioned in the seal counterbore;

a second female connector member including an annular main body portion, latch means extending rearwardly from the main body portion for latching coaction with the first female connector member latch means to mount the main body portion in a position extending forwardly from the front annular edge of the first female connector member, and a plurality of circumferentially spaced resilient finger portions extending rearwardly and radially inwardly from the front end of the main body portion and latchingly coacting at their free rearward ends with the rear annular face of the bead with the members in coupled relation; and seal retainer means, including retainer means defined by said second female connector member, operative with the female members latched together to preclude forward movement of the seal out of the seal counterbore.

10. A coupling according to claim 9 wherein:

the seal retainer means includes an annular seal retainer positioned within the second female connector member and against the forward annular edge of the first female connector member, defining a rearward annular face positioned proximate the seal to retain the seal in the seal bore, and defining a forward annular face for seating coaction with the forward annular face of the bead with the members in coupled relation; and the second female connector member retainer means includes a plurality of circumferentially spaced ribs on the inner surface of the main body portion of the second female connector member abuttingly engaging the forward annular face of the seal retainer with the female members latched together.

11. A coupling according to claim 10 wherein the seal defines a forward annular face positioned rearwardly of the forward annular edge of the first female connector member and the seal retainer includes a portion extending rearwardly into the seal bore to a position proximate the forward annular face of the seal.

12. A coupling according to claim 10 wherein the seal retainer is arranged to snap in place on the forward annular edge of the first female connector member.

13. A coupling according to claim 10 wherein the inner diameter of the seal retainer approximates the diameter of the pilot portion and defines and sliding fit with the pilot portion.

14. A coupling according to claim 9 wherein the second female connector member snaps in place over the first female connector member proximate the forward annular edge of the first female connector member.

15. A coupling according to claim 9 wherein the seal comprises a single piece annular elastomeric member defining a series of axially spaced radially inwardly extending annular seal ribs sealingly and slidably engaging the pilot portion in response to insertion of the pilot portion into the front end of the first female connector member.

16. A female quick connector assembly for use with a male quick connector member including an axially extending front end pilot portion and an external annular bead defined at the rear end of the pilot portion, said female quick connector assembly comprising:

a female connector member structure defining an axially extending capture bore sized to receive the pilot portion, a seal counterbore coaxial with and positioned forwardly of the capture bore, and latching means for latching coaction with the rear annular face of the male connector member bead in response to insertion of the pilot portion into the front end of the female member structure and into the capture bore; and an annular elastomeric seal positioned in the seal bore and including a tubular main body portion, a series of internal annular axially spaced rib portions defined on the interior of the main body portion for successive sealing coaction with the pilot portion as the pilot portion is inserted into the front end of the female member structure and into the capture bore, and a series of external annular axially spaced rib portions defined on the exterior of the main body portion for coaction with the seal counterbore.

17. A connector assembly according to claim 16 wherein the internal seal rib portions correspond in number to the external seal rib portions.

18. A connector assembly according to claim 17 wherein the internal seal rib portions are respectively radially aligned with the external seal rib portions.

19. A connector assembly according to claim 16 wherein the internal seal rib portions have a relaxed inner diameter slightly less than the diameter of the pilot portion so that the rib portions deformably, sealingly and successively engage the pilot portion as the male connector member is inserted into the seal.

20. A connector assembly according to claim 16 wherein the external seal rib portions have a relaxed outer diameter slightly greater than the diameter of the seal counterbore so that the seal may be positioned in the seal counterbore with a frictional interference fit.

* * * * *